United States Patent [19]

Zillner

[11] Patent Number: 5,452,762

[45] Date of Patent: Sep. 26, 1995

[54] ENVIRONMENTAL CONTROL SYSTEM USING POLED DIODES TO ALLOW ADDITIONAL CONTROLLED DEVICES IN EXISTING FOUR WIRE SYSTEM

[76] Inventor: Anthony H. Zillner, Jr., 438 Lotus La., Glenview, Ill. 60025

[21] Appl. No.: 90,817

[22] Filed: Jul. 13, 1993

[51] Int. Cl.[6] .............................. F25B 29/00; F24F 3/14
[52] U.S. Cl. .................... 165/21; 165/24; 165/26; 165/20; 236/51; 236/44 C
[58] Field of Search .................. 165/20, 3, 24, 165/25, 26; 236/51, 44 C

[56] References Cited

U.S. PATENT DOCUMENTS

| | | |
|---|---|---|
| 2,110,025 | 3/1938 | Ridge .......................... 165/25 |
| 2,133,872 | 10/1938 | Roessler . |
| 2,544,544 | 3/1951 | Qualley et al. . |
| 3,305,173 | 2/1967 | Beckman ...................... 236/11 |
| 3,580,501 | 5/1971 | Streed . |
| 3,587,558 | 6/1971 | Raleigh . |
| 3,815,668 | 6/1974 | Carlson ........................ 165/26 |
| 3,945,564 | 3/1976 | Smallegan ..................... 236/51 |
| 4,083,397 | 4/1978 | Kimpel et al. ................. 165/26 |
| 4,186,873 | 2/1980 | Geisler et al. . |
| 4,290,480 | 9/1981 | Sulkowski . |
| 4,582,123 | 4/1986 | Williams . |
| 4,659,009 | 4/1987 | Newell, III . |
| 4,683,939 | 8/1987 | Levine . |
| 4,750,545 | 6/1988 | Hile et al. . |
| 4,775,099 | 10/1988 | Podlipnik . |
| 4,776,514 | 10/1988 | Johnstone et al. . |
| 4,815,524 | 3/1989 | Dempsey et al. . |
| 4,841,738 | 6/1989 | Katsuki et al. . |
| 4,842,044 | 6/1989 | Flanders et al. . |
| 4,852,363 | 8/1989 | Kampf et al. . |
| 4,886,110 | 12/1989 | Jackson . |
| 4,889,179 | 12/1989 | Merenda . |
| 4,948,045 | 8/1990 | Romano . |
| 4,974,665 | 12/1990 | Zillner, Jr. .................... 165/26 |
| 5,038,851 | 8/1991 | Mehta . |
| 5,065,813 | 11/1991 | Berkeley et al. . |
| 5,127,464 | 7/1992 | Butler et al. . |
| 5,161,606 | 11/1992 | Berkeley et al. . |

FOREIGN PATENT DOCUMENTS 62-125248 6/1987 Japan .

Primary Examiner—John K. Ford
Attorney, Agent, or Firm—Mason, Kolehmainen, Rathburn & Wyss

[57] ABSTRACT

An environmental control system for controlling heating, ventilation, humidification and air conditioning equipment located in plant area of a house includes a kit consisting of a remote control unit located in a living space of a house that is linked by a four wire link to a main control unit located in or adjacent the plant area. The remote control unit has a temperature control device, a humidity control device, and a fan control device. Additionally, the remote control unit may include indicating devices and/or an internal battery charger for a rechargeable battery that may be used to operate electronic circuits and controls in the remote unit. AC power from an AC transformer in the plant area is supplied to each of the control devices via the four wire link. The main control unit has relay coils coupled to the four wires in the wire link via selectively poled diodes. The selective energizing of these relay coils results in the opening and closing of relay contacts in the main control unit through which AC power is supplied to the heating, ventilation, humidification and air conditioning equipment located in the plant area to thereby control the operation of that equipment.

15 Claims, 2 Drawing Sheets

ENVIRONMENTAL CONTROL SYSTEM USING POLED DIODES TO ALLOW ADDITIONAL CONTROLLED DEVICES IN EXISTING FOUR WIRE SYSTEM

BACKGROUND OF THE INVENTION

1. Field of the Invention

The present invention relates generally to environmental control systems for heating, ventilating, humidifying and air conditioning equipment, and, more particularly, to a new and improved kit including a thermostat or remote control unit located in a living space of a house and a main control unit located in the vicinity of the heating, ventilating, humidifying and air conditioning equipment that enables the remote control unit to separately control via existing four wire circuits the heating, ventilating, humidifying and air conditioning equipment.

2. Description of the Prior Art

In many conventional household forced air heating, ventilating and air conditioning systems (commonly referred to as HVAC systems), heated or cooled forced air is supplied by a blower fan in a furnace to the different living spaces within the house. Humidification of that living space also is desirable because a low level of humidity can result in static shocks and drying of a person's respiratory track. Moreover, moisture in the living space tends to retain heat resulting in the temperature being more uniformly maintained in the living space. The addition of moisture to a dry and hot living space also can be used to reduce the air temperature in the living space due to the fact that the moisture absorbs heat.

The humidification of the forced air being supplied to the living spaces in a forced air system usually is accomplished by means of a humidifier that is slaved to the blower fan of the HVAC system. On the other hand, the blower fan is dependent upon the operation of the furnace so that humidification tends to be provided to the living spaces of a house only when the temperature in the living spaces is being adjusted. As a result, the humidity in the living space may be less than optimum. In fact, little, if any, humidification will be provided to the living spaces when the outside air temperature and the thermostat setting for the inside living spaces are about the same. Yet the living spaces might still need additional humidification so that a condition of low humidity in the living spaces of the house can occur.

Accordingly, it would be advantageous to have an environmental control system that permits the humidification in the living spaces to be separately controlled independent of the heating and cooling functions. However, most HVAC systems only have four wires extending from the thermostat located in the living space and the furnace and/or air conditioner units. With such a four wire system, the humidifier typically is slaved to the furnace blower and not separately controlled because additional wires would be needed to provide such independent control of the humidifier. In fact, certain systems have accomplished independent control of a humidifier by extending six wires from the living space (thermostat) to the furnace and air conditioner. Unfortunately, such six-wire systems cannot be utilized unless the existing four wire system is rewired.

A humidity control system is disclosed in U.S. Pat. No. 4,974,665 that issued on Dec. 4, 1990 to the inventor of the present application. The control system disclosed in that patent provides for controlling of the heating and air conditioning independently of ventilation and humidification. This independent control is accomplished even though only a four-wire link extends between temperature and fan/humidity controls located in the living space and the heating, air conditioning, ventilation and humidification equipment located in a plant/furnace area of the house. However, this system requires that the output of a typical AC transformer used in a heating system be full-wave rectified before the potential is supplied to the remote control unit. Moreover, the fan and humidifier control are combined into one switch so that the fan for ventilation cannot be independently controlled when the humidity is being controlled. In other words, the system does not permit the fan to be activated continuously while the humidity is being controlled.

Another heating/cooling control system is disclosed in U.S. Pat. No. 4,083,397 issued on Apr. 11, 1978. This system enables the heating and cooling functions to be controlled even though only two wires extend between an thermostat and the heating and air conditioning equipment. However, this system does not provide for the separate control of humidification equipment or the furnace blower fan.

SUMMARY OF THE INVENTION

Accordingly, an object of the present invention is to provide a new and improved environmental control system by which heating, ventilation, humidification and air conditioning functions can be separately controlled by a remote control unit located in the living space of a house even though only four wires extend between the remote control unit and the plant or furnace area where the heating, ventilation, humidification and air conditioning equipment is located.

Another object of the present invention is to provide a new and improved environmental control system including a kit having a remote control unit located in the living area to be controlled and a main control unit that provides an interface between the remote control unit and the plant equipment for heating, ventilation, humidification and air conditioning using only existing four wires that extend from the remote control unit.

Yet another object of the present invention is to provide a new and improved environmental control system that not only enables a remote control unit in a living space of a house to independently control via existing four wire circuitry the heating, ventilation, humidification and air conditioning equipment located in a plant or furnace area of a house, but also enables the remote control unit to have a battery charger for recharging a battery that can be used to operate electronic control circuits in the remote unit.

In accordance with these and many other objects of the present invention, an environmental control system embodying the present invention includes a kit having a remote control unit to be located in a living space of a house and a main control unit in the plant or furnace area of the house that enables the linking of the remote control unit and heating, ventilation, humidification and air conditioning equipment located in the plant or furnace area by an existing four wire link that extends from the living space to the plant area. The remote control unit has a temperature control device that can be selectively placed in heat, off, and cool positions; a humidity control device that can be selectively placed in humidify, off and dehumidify positions; and a fan control device that can be selectively placed in auto and continuous positions. Additionally, the remote control unit may include a temperature indicating device, a relative humidity indicating device and/or an internal battery charger for a rechargeable battery that may be used to operate electronic circuits and controls in the remote unit. AC power from an AC transformer in the plant area or a supplementary AC transformer in the main control unit is supplied to each of the control devices via a first one of the four wires extending to the remote control unit from the main control unit in the plant area of the house. The temperature control device includes oppositely poled diodes coupled to a second one of the wires extending between the remote control unit and the main control unit; the fan control device includes another diode that is coupled to a third one of the wires extending to the remote control unit from the main control unit; and the humidity control device is coupled to the fourth one of the wires extending to the remote control unit from the main control unit. Additionally, a battery/battery charger in the remote control unit is coupled between the first and fourth wires by another diode. The main control unit has relay coils coupled to the four wire link. The selective energizing of these relay coils results in the opening and closing of relay contacts in the main control unit through which AC power is supplied to the heating, ventilation, humidification and air conditioning equipment located in the plant or furnace area to thereby control the operation of that equipment.

BRIEF DESCRIPTION OF THE DRAWING

These and other objects and advantages of the present invention will become readily apparent upon consideration of the following detailed description of the embodiment of the invention shown in the accompanying drawings wherein.

DETAILED DESCRIPTION OF THE PREFERRED EMBODIMENT

Figure 1:
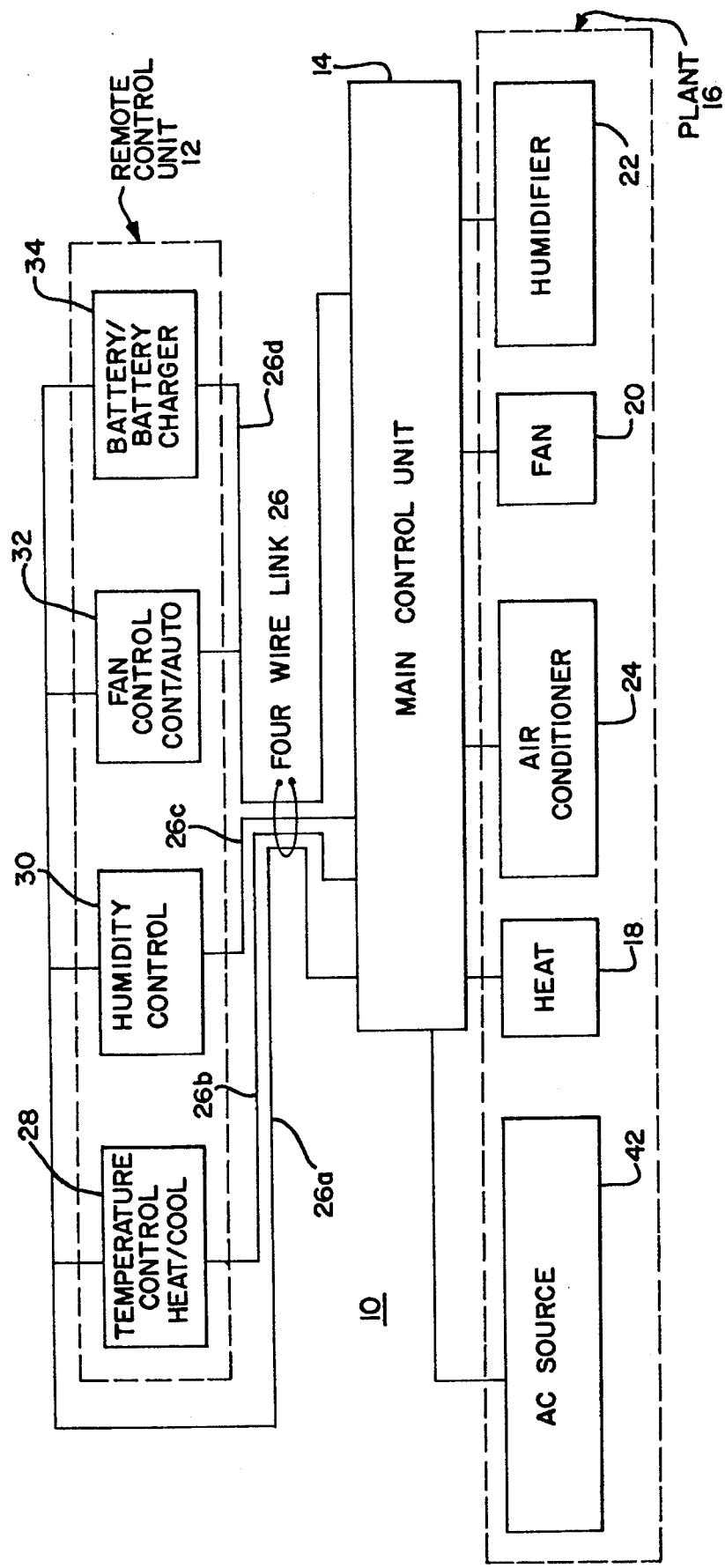
FIG. 1 is a block diagram showing the HVAC control system embodying the present invention.

Referring now more specifically to FIG. 1 of the drawings, therein is disclosed a HVAC control system generally designated by the reference numeral 10 and embodying the present invention. The HVAC control system 10 may be in the form of a kit that includes a remote control unit 12 that is adapted to be located in a living space of a house and a main control unit 14 that is adapted to be located in or adjacent a plant or furnace area 16 of the house. The main control unit 14 links or provides an interface between the remote control unit 12 and heating equipment 18, ventilation/fan equipment 20, humidification equipment 22 and air conditioning equipment 24 located in the plant or furnace area 16. The remote control unit 12 and the main control unit 14 can be coupled or linked to each other via an existing four wire link 26 that extends from the living space to the plant area 16.

The remote control unit 12 includes a temperature control device 28 for controlling the operation of the heating equipment 18 and the air conditioning equipment 24; a humidity control device 30 for controlling the operation of the humidification equipment 22; and a fan control device 32 for controlling the operation of the ventilation/fan equipment 20. The remote control unit 12 also may include an internal battery charger/battery device 34 so that a rechargeable battery can be used to provide power to battery operated electronic circuits and controls that may be included in the remote unit 12. In addition, the remote control unit 12 may include indicating devices, such as a temperature indicating device (not illustrated) or a relative humidity indicating device (not illustrated).

AC power from an AC power source 36 in the plant area 16 or from a supplementary AC transformer in the main control unit 14 is supplied to each of the control devices 28, 30 and 32 as well as the battery charger 34 via one of the wires in the four wire link 26, such as a wire 26a. The output from the temperature control device 28 is coupled via a second one of the wires, a wire 26b, in the four wire link 26 to the main control unit 14; the output from the humidity control device 30 is coupled via a third one of the wires, a wire 26c, to the main control unit 14; and the output from the fan control device 32 and the battery charger/battery 34 are coupled via a fourth one of the wires, a wire 26d, to the main control unit 14.

The main control unit 14 has relay coils coupled to the four wire link 26 that control the opening and closing of relay contacts in the main control unit 14 in response to signals received from the remote control unit 12. As a result, the main control unit 14 selectively supplies AC power to selectively operate the heating equipment 18, the ventilation/fan equipment 20, the humidification equipment 22 and the air conditioning equipment 24 located in the plant or furnace area 16 to thereby control the operation of that equipment. This separate control of the heating equipment 18, the ventilation/fan equipment 20, the humidification equipment 22 and the air conditioning equipment 24 by the remote control unit 12 is accomplished even though only the four wire link 26 interconnects the remote control unit 12 located in the living space of a house to the main control unit 14 located adjacent to the plant area 16.

Figure 2:
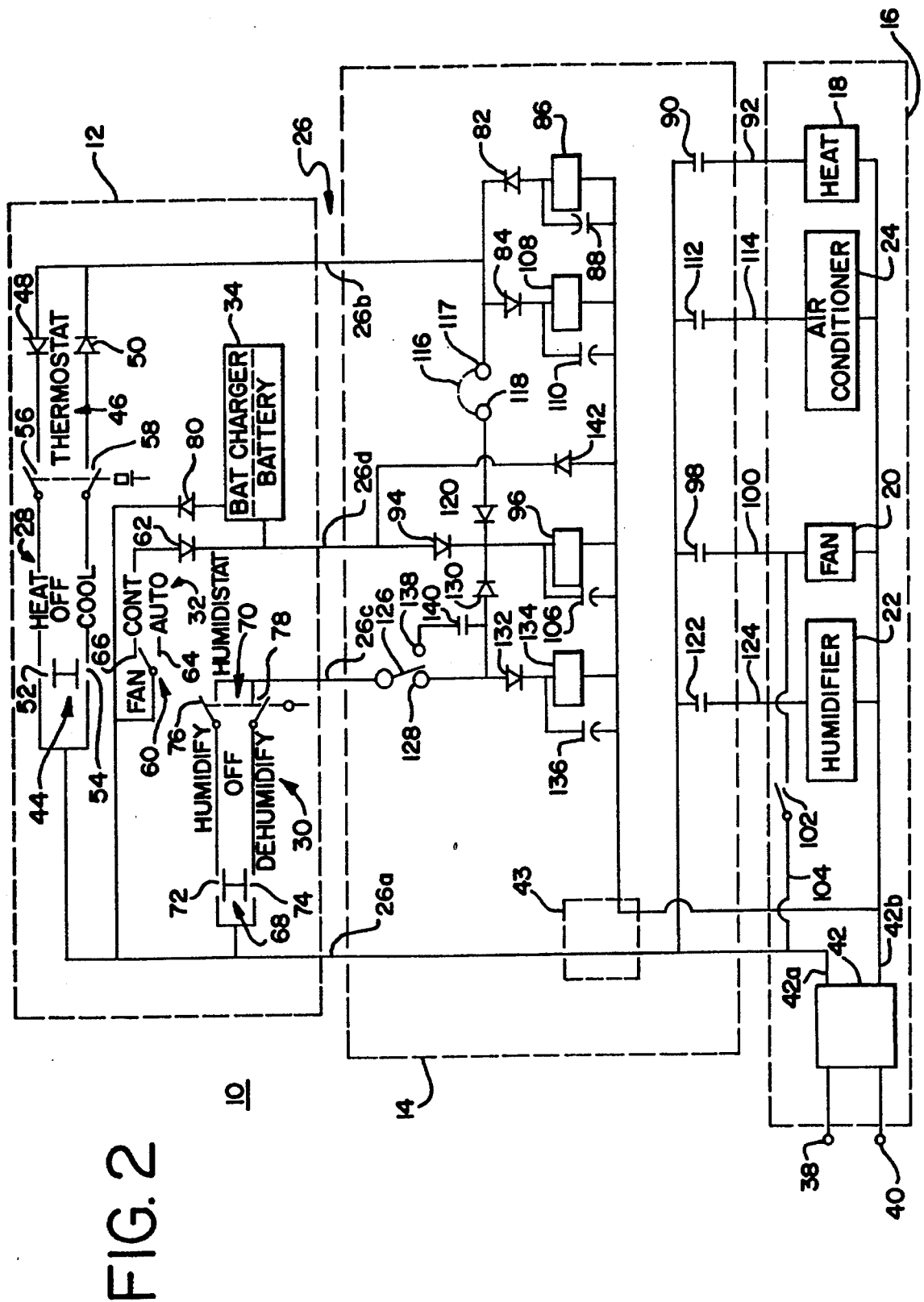
FIG. 2 is a schematic wiring diagram of the HVAC control system of FIG. 1

An embodiment of the HVAC system 10 is more fully disclosed in the schematic diagram of FIG. 2. Conventional AC line potential is supplied to input terminals 38 and 40 of an AC transformer 42. The AC transformer 42 reduces the AC input voltage at the output lines 42a and 42b extending from the transformer 42 to the main control unit 16. This reduced AC voltage is supplied to the wire 26a so as to provide the reduced voltage as an input to the devices 28, 30, 32 and 34 in the remote control unit 12. The AC transformer 42 may be a part of a standard furnace system in the plant area 16 of the house that typically transforms conventional 120 VAC to 24 VAC. In the event that additional power is needed to operate the HVAC control 10 or if the HVAC control 10 needs to be designed for a voltage other than the voltage produced by the transformer 42, an additional power transformer or another device 43 capable of supplying the required voltage (shown in phantom lines in FIG. 2) can be included in the main control unit 16. The input for that additional power transformer or device 43 may be the output 42a and 42b from the transformer 42 (as is illustrated in FIG. 2) or the supply voltage from the input terminals 38 and 40. In either case, the output of that additional power transformer 42 is coupled to the remote unit 12 via the wire 26a.

The wire 26a is coupled to the temperature control device 28 and thereby supplies AC power to that temperature control device 28. The temperature control device 28 includes a temperature selector switch 44, a thermostat 46 and a pair of oppositely poled diodes 48 and 50. The temperature selector switch 44 can be selectively moved into off, heat and cool positions. When the temperature selector switch 44 is in its off position, normally open contacts 52 and 54 remain open so that no AC potential is provided through the temperature selector switch 44 to the thermostat 46.

The movement of the temperature selector switch 44 to its heat position results in the contacts 52 being closed while the contacts 54 remain open. As a result, AC potential is supplied to a heat contact 56 of the thermostat 46. The heat contact 56 remains open as long as the thermostat 46 is sensing a temperature in the living space where the remote control unit 12 is situated of at least a desired temperature set by the thermostat 46. When the heat contact 56 closes due to a decrease below the desired temperature of the temperature being sensed by the thermostat 46, AC potential is supplied via the closed contacts 52 and 56 through the diode 48 and the wire 26b to the main control unit 14. Due to the diode 48, only negative half cycles of the AC potential is supplied through the wire 26b to the main control unit 14 when the contacts 52 and 56 are closed.

In a similar manner, the movement of the temperature selector switch 44 to its cool position results in the contacts 54 being closed while the contacts 52 are in their normally open state. As a result, AC potential is supplied to a cool contact 58 of the thermostat 46. The cool contact 58 remains open as long as the thermostat 46 is sensing a temperature of less than a desired temperature set by the thermostat 46. When the cool contact 58 closes due to an increase above the desired temperature of the temperature being sensed by the thermostat 46, AC potential is supplied via the closed contacts 54 and 58 through the diode 50 and the wire 26b to the main control unit 14. Due to the diode 50, only positive half cycles of the AC potential is supplied through the wire 26b to the main control unit 14 when the contacts 54 and 58 are closed.

The fan control device 32 also is coupled to the wire 26a so that AC potential from the AC transformer 42 is supplied to the fan control device 32. The fan control device 32 includes a fan selector switch 60 and a diode 62. The fan selector switch 60 can be selectively moved into continuous (cont) and auto positions.

When the fan selector switch 60 is in its auto position, a normally open contact 64 is contacted by the fan switch 60. However, the contact 64 is not coupled to the diode 62 so no AC potential is provided through the fan selector switch 60 to the diode 62. On the other hand, AC potential will be supplied via the fan selector switch 60 to the diode 62 when the fan selector switch 60 is placed in its continuous position because the fan switch 60 makes contact with a contact 66. As a result, positive half cycles of the AC potential from the wire 26a will be supplied via the wire 26d to the main control unit 14.

The wire 26a also is coupled to the humidity control device 30 and thereby supplies AC power to that humidity control device 30. The humidity control device 30 includes a humidity selector switch 68 and a humidistat 70. The humidity selector switch 68 can be selectively moved into humidify and dehumidify positions. When the humidity selector switch 68 is in its off position, normally open contacts 72 and 74 remain open so that no AC potential is provided through the humidity selector switch 68 to the humidistat 70.

The movement of the humidity selector switch 68 to its humidify position results in the contacts 72 being closed while the contacts 74 remain open. As a result, AC potential is supplied to a humidify contact 76 of the humidistat 70. The humidify contact 76 remains open as long as the humidistat 70 is sensing a humidity of at least a desired humidity set by the humidistat 70. When the humidify contact 76 closes due to a decrease below the desired humidity of the humidity being sensed by the humidistat 70, AC potential is supplied via the closed contacts 72 and 76 through the wire 26c to the main control unit 14.

The movement of the humidity selector switch 68 to its dehumidify position results in the contacts 74 being closed while the contacts 72 are in their normally open state. As a result, AC potential is supplied to a dehumidify contact 78 of the humidistat 70. The dehumidify contact 78 remains open as long as the humidistat 70 is sensing a humidity of less than a selected humidity set by the humidistat 70. When the dehumidify contact 78 closes due to an increase above the selected humidity of the humidity being sensed by the humidistat 70, AC potential is supplied via the closed contacts 74 and 78 through the wire 26c to the main control unit 14.

As previously indicated, the remote control unit 12 includes the battery charger/battery device 34. The battery charger/battery device 34 is coupled to the wire 26a through a diode 80. The diode 80 is designed so that only negative half cycles of the AC potential from the wire 26a will be supplied to the battery charger/battery device 34. The negative half cycles of the AC potential so supplied are used by the battery charger/battery device 34 to charge a rechargeable battery that forms a part of the battery charger/battery device 34. The rechargeable battery within the battery charger/battery device 34 can be used for battery operated controls that may be included as a part of the remote control unit 12.

As heretofore indicated, negative half cycles of the AC potential from the wire 26a will be supplied to the wire 26b through the closed contacts 52 and 56 and the diode 48 when the temperature selector switch 44 is set to its heat position and when the temperature sensed by the thermostat 46 is below a preselected temperature. The negative half cycles of AC potential so supplied to the wire 26b in affect is a pulsating negative DC potential that flows into the main control unit 14 to both diodes 82 and 84. The diode 82 can be considered a heat diode because it will allow this pulsating negative DC potential to be coupled to a heat relay coil 86 to thereby energize the heat relay coil 86. A capacitor 88 coupled across the heat relay coil 86 converts the pulsating negative DC potential to essentially a continuous negative DC potential so that the heat relay coil 86 will remain energized continuously as long as the contacts 52 and 56 both remain closed.

The energization of the heat relay coil 86 causes the closing of normally open relay contacts 90 in the main control unit 14. The closing of the relay contacts 90 results in AC potential from the AC transformer 42 being supplied to the heating equipment 18 located in the plant area 16 through a wire 92 extending from the main control unit 14 to the plant area 16. For example, the heating equipment 18 can be a furnace with a gas valve that will be turned on when the relay contacts 90 are closed and AC potential is supplied through the wire 92. In addition to the activation of the heating equipment 18, the fan 20 also has to be energized in order that air heated in the heating equipment 18 can be circulated throughout the house including the living space where the remote control unit 12 is located. If the fan selector switch 60 of the fan control device 32 is set in its auto position, no potential is supplied via the wire 26d and a diode 94 in the main control unit 14 to a fan relay coil 96 also located in the main control unit 14. As long as the fan relay coil 96 remains deenergized, normally open contacts 98 remain open and no AC potential is supplied to the fan equipment 20 through a wire 100 extending from the main control unit 14.

In such an instance, the energization of the fan 20 is controlled by a fan limit switch 102 associated with the heating equipment 18 in the plant area 16. The fan limit switch 102 is a normally open switch that closes once the air in the heating equipment 18 has reached a selected temperature and remains closed until air in the heating equipment 18 has fallen below a selected temperature. When the fan limit switch 102 does close due to the increase in the air temperature in the heating equipment 18, AC potential from the AC transformer 42 is supplied to the fan 20 to operate the fan 20 through the fan limit switch 102 and a wire 104 extending from the output 42a of the transformer 42.

On the other hand, the activation of the fan 20 may be accomplished by placing the fan selector switch 60 to its continuous position so that the contact 66 is closed. When the contact 66 is closed, positive half cycles of AC potential from the wire 26a is supplied through the diode 62, the wire 26d and the diode 94 to the fan relay coil 96. The fan relay coil 96 is thereby supplied with essentially continuous positive DC potential due to a capacitor 106 that is coupled across the relay coil 96. When the relay coil 96 is so energized, the normally open fan relay contacts 98 are closed such that AC potential is supplied to the fan 20 through the wire 100 that extends from the main control unit 14 to the plant area 16. Consequently, the fan 20 will remain energized or on whenever the fan selector switch 60 is in its continuous (cont) position.

The heating equipment 18 remains energized until the temperature selector switch 44 is moved from its heat position (i.e., until the contacts 52 are open) or until the heat contact 56 in the thermostat 46 opens due to an increase in the temperature in the living space where the remote control unit 12 is located above the desired temperature. When either of these events occur, the heat relay coil 86 will no longer be energized and the relay contact 90 reverts to its normally open condition such that no AC potential is supplied to the heating equipment 18 through the wire 92. Even though the heating equipment 18 is no longer energized, the fan 20 will remain energized as long as the fan selector switch 60 is in its continuous position or as long as the fan limit switch 102 remains closed due to the sensed temperature from the heating equipment 18 being sensed by the fan limit switch 102.

When the air conditioning equipment 24 is to be operated, the temperature selector switch 44 is moved to its cool position. The movement of the temperature selector switch 44 to its cool position results in the closing of the contacts 54. When this occurs, the contacts 52 necessarily must be opened because the temperature selector switch 44 cannot be simultaneously placed in both its heat and cool positions. Consequently, the heating equipment 18 and the air conditioning equipment 24 cannot be operated simultaneously.

As heretofore indicated, positive half cycles of the AC potential from the wire 26a will be supplied to the wire 26b through the closed contacts 54 and 58 and the diode 50 when the temperature selector switch 44 is set to its cool position and when the temperature sensed by the thermostat 46 is above the desired temperature. The positive half cycles of AC potential in affect is a pulsating positive DC potential that flows into the main control unit 14 to the diodes 82 and 84. The diode 84 can be considered a cool diode because it will allow the pulsating positive DC potential to be coupled to a cool relay coil 108 to thereby energize the relay coil 108 whereas the heat diode 82 blocks the pulsating positive DC potential from energizing the heat relay coil 86. A capacitor 110 coupled across the cool relay coil 108 converts the pulsating positive DC potential to essentially a continuous positive DC potential so that the cool relay coil 108 will remain energized continuously as long as the contacts 54 and 58 both remain closed.

The energization of the cool relay coil 108 causes the closing of normally open relay contacts 112 in the main control unit 14. The closing of the relay contacts 112 results in AC potential from the AC transformer 42 being supplied to the air conditioning equipment 24 located in the plant area 16 through a wire 114 extending from the main control unit 14 to the plant area 16. The supplying of AC potential to the air conditioning equipment 24 will result in the compressor portion of the air conditioning equipment 24 to be activated to produce coolant in conduits in the furnace or like located in the plant area 16. In addition to the activation of the air conditioning equipment 24, the fan 20 also has to be energized in order that cooled air from the air conditioning equipment 24 is circulated throughout the house including the living space where the remote control unit 12 is located.

If the fan selector switch 60 of the fan control device 32 is set in its auto position, no potential is supplied via the wire 26d and the diode 94 in the main control unit 14 to the fan relay coil 96 also located in the main control unit 14. In such circumstances, the energization of the fan 20 is controlled by the air conditioning equipment 24 which can be adapted to activate the fan 20 anytime the air conditioning equipment 24 is activated. On the other hand, the main control unit 14 can be adapted so that the fan 20 is activated anytime the air conditioning equipment 24 is activated. In order to so adapt the main control unit 14, a jumper 116 (shown in phantom lines in FIG. 2) is placed across terminals 117 and 118. When the jumper 116 is across the terminals 117 and 118, the pulsating positive DC potential being supplied along the wire 26b is not only supplied to the cool relay coil 108 through the diode 84, but also through a diode 120 to the fan relay coil 96. As a result, the fan relay coil 96 is energized whenever the cool relay coil 108 is energized. As is discussed heretofore, the energization of the fan relay coil 96 results in the closing of contacts 98 and the activation of the fan equipment 20.

On the other hand, the activation of the fan 20 during the time that the air conditioning equipment 24 is activated may be accomplished by placing the fan selector switch 60 to its continuous position so that the contact 66 is closed. When the contact 66 is closed, positive half cycles of AC potential from the wire 26a are supplied through the diode 62, the wire 26d and the diode 94 to the fan relay coil 96. The fan relay coil 96 is thereby supplied with essentially continuous positive DC potential due to the capacitor 106 that is coupled across the relay coil 96. As previously discussed, energization of the relay coil 96 in this manner results in the fan 20 being operated.

The air conditioning equipment 24 remains energized until the temperature selector switch 44 is moved from its cool position (i.e., until the contacts 54 are open) or until the cool contact 58 in the thermostat 46 opens due to a decrease in the temperature in the living space where the remote control unit 12 is located below the desired temperature. When either of these events occur, the cool relay coil 108 will no longer be energized and the relay contacts 112 revert to their normally open state such that no AC potential is supplied to the air conditioning equipment 24 through the wire 114. In the event that the fan 20 is being controlled solely by the air conditioning equipment 24 or by the fan relay coil 96 due to the use of the jumper 116 in the main control unit 14, the fan 20 also will be turned off as soon as the air conditioning equipment 24 is no longer energized.

The other equipment in the plant area 16 to be controlled by the HVAC control system 10 is the humidification equipment 22. The humidification equipment 22 is controlled by the humidity control device 30 and either may be a humidifier to provide humidity to the living space or may be a dehumidifier for extracting humidity form the air in the living space. When the humidity selector switch 68 is in its off position, no AC potential is supplied from the wire 26a to the wire 26c and the humidifier equipment 22 remains inactive. The reason that the humidifier equipment 22 is not activated is because normally open contacts 122 in the main control unit 14 remain open so that no AC potential is supplied to the humidifier equipment 22 via a wire 124 extending from the main control unit 14 into the plant area 16.

In order to activate the humidifier equipment 22, the humidity selector switch 68 needs to be placed into its humidify position so that the contacts 72 are closed or in its dehumidify position so that the contacts 74 are closed. As heretofore indicated, AC potential from the wire 26a will be supplied to the wire 26c through the closed contacts 72 and 76 when the humidify selector switch 68 is set to its humidify position and when the humidity being sensed by the humidistat 70 is below a preselected amount or the closed contacts 74 and 78 when the humidify selector switch 68 is set to its dehumidify position and when the humidity being sensed by the humidistat 70 is above a preselected amount. The AC potential from the wire 26a flows into the main control unit 14 and to a humidity switch 126. When the humidity switch 126 is closed against a contact 128 as is illustrated in FIG. 2, the AC potential from the wire 26c is supplied to both diodes 130 and 132.

The diode 130 permits only the passage of positive half cycles of the AC potential such that a pulsating positive DC potential is coupled to the fan relay coil 96 and the fan relay coil 96 is energized. As previously discussed, the energization of the fan relay coil 96 will cause the fan 20 to be activated if it is not already activated for some other reason, as for example, the placement of the fan selector switch 60 into its continuous position. Consequently, the fan 20 is operated whenever the humidifier equipment 22 is operated because the fan relay coil 96 also will be energized when the contacts 72 and 76 or the contacts 74 and 76 of the humidity control device 30 are closed and the humidity switch 126 is closed against the contact 128.

The diode 132 also permits only the passage of positive half cycles of the AC potential such that a pulsating positive DC potential is coupled to a humidifier relay coil 134. A capacitor 136 coupled across the humidifier relay coil 134 converts the pulsating positive DC potential to essentially a continuous positive DC potential so that the humidifier relay coil 134 will remain energized continuously as long as either the contacts 72 and 76 both remain closed or the contacts 74 and 78 both remain closed and the humidity switch 126 is closed against the contact 128.

The energization of the humidifier relay coil 134 results in the closing of the normally open relay contacts 122 in the main control unit 14. The closing of the relay contacts 122 results in AC potential from the AC transformer 42 being supplied to the humidifier equipment 24 located in the plant area 16 through the wire 124 extending from the main control unit 14 to the plant area 16. The supplying of AC potential to the humidifier equipment 22 will result in activation of that humidifier equipment 22 so that humidified air will be supplied to the living spaces of the house due to the fact that the fan 20 also will be operated.

In certain circumstances, it is desirable to have the humidifier equipment 22 activated only when the heating equipment 18 is operated. When this so-called slaving of the operation of the humidifier equipment 22 to the heating equipment 18 is to be accomplished, the humidity switch 126 is moved from the position shown in FIG. 2 in contact with the contact 128 to a position where it no longer makes contact with the contact 128, but instead makes contact with another contact 138. When the humidity switch 126 is in contact with the contact 138, no AC potential from the wire 26c is supplied to the diodes 130 and 132 as long as normally open contacts 140 remain open. The contacts 140 are controlled by the heat relay coil 86 such that the contact 140 is closed only when the heat relay coil 86 is energized. Consequently, the humidifier relay coil 134 can be energized only when the heating equipment 18 also is energized whenever the humidity switch 126 is making contact with the contact 138.

The humidifier equipment 22 remains energized until the humidity selector switch 68 is moved from its humidity or dehumidify positions (i.e., until the contacts 72 or 74 are open) or until the corresponding contacts 76 or 78 in the humidistat 70 open due to a change in the humidity in the living space where the remote control unit 12 is located. When either of these events occur, the humidifier relay coil 134 will no longer be energized and the relay contacts 122 revert to their normally open condition such that no AC potential is supplied to the humidifier equipment 22 through the wire 124.

As previously indicated, the battery charger/battery device 34 utilizes negative half cycles of the AC potential from the wire 26a being supplied through the diode 80. In order to complete the circuit for the charging of the battery charger/battery device 34, the battery charger/battery device 34 is coupled through the wire 26d and a diode 142 to the transformer output 42b. Due to the fact that the battery charger/battery device 34 is utilizing the negative half cycles of the AC voltage and the fan control device 32 is utilizing the positive half cycles of the AC voltage, the battery charger/battery device 34 can utilize the same wire 26d extending from the remote control unit 12 to the main control unit 14 as the fan control device 32 without interfering with the control function of the fan control device 32.

As can be appreciated, the HVAC control system 10 enables the heating equipment 18, the air conditioning equipment 24, the ventilating equipment 20, and the humidification equipment 22 located in the plant area 16 to be separately and individually controlled at the remote control unit 12 located in the living space of a house even though only the four wire link 26 extends from the plant area 16 to the remote control unit 12. This is because the HVAC control system 10 is in the form of a kit that not only includes the remote control unit 12 that is to be located in the living space of a house, but also the main control unit 14 that is to be located in or adjacent the plant area 16 of the house. The main control unit 14 acts as an interface between the remote control unit 12 and the heating equipment 18, the ventilation/fan equipment 20, the humidification equipment 22 and the air conditioning equipment 24 located in the plant area 16. Even though a number of wires, such as for example, the wires 92, 114, 100, and 124, need to be extended from the main control unit 14 to the equipment 18, 20, 22, and 24 in the plant area 16, these wires can be readily installed because the main control unit is in or adjacent the plant area 16. On the other hand, the remote control unit 12 only needs to be coupled to the main control unit 14 by the four wire link 26 which should already be available in most houses.

Obviously, many modifications and variations of the present invention are possible in light of the above teachings. For example, the polarity of the diodes disclosed in FIG. 2 can be reversed and the HVAC control system 10 will nevertheless operate utilizing different half cycles of the AC potential to control the operation of the heating equipment 18, the ventilation equipment 20, the humidification equipment 22 and the air-conditioning equipment 24. Thus, it is to be understood that, within the scope of the appended claims, the invention may be practiced otherwise than as specifically described above.

What is claimed and desired to be secured by Letters Patent of the United States is:

1. A kit for a heating, ventilating, air conditioning and humidifying system that includes heating means, ventilating means, air conditioning means and humidifying means in a plant area comprising:
   a remote control unit located remotely from said plant area and including:
      a temperature control means for controlling the operation of said heating and air conditioning means,
      a ventilating control means for controlling the operation of said ventilating means, and
      a humidity control means for controlling the operation of said humidifying means independent of said ventilating control means;
   a main control unit located adjacent said plant area and including:
      heat responsive means responsive to said temperature control means for activating said heating means,
      cool responsive means responsive to said temperature control means for activating said air conditioning means,
      ventilating responsive means responsive to at least said ventilating control means for activating said ventilating means, and
      humidity responsive means responsive to said humidity control means for activating said humidifying means;
   a connecting link means for coupling said remote control unit to said main control unit consisting essentially of first, second, third and fourth wires extending from said main control unit to said remote control unit, said first wire coupling AC potential to said remote control unit, said second wire coupling said temperature control means to said main control unit, said third wire coupling said ventilating control means to said main control unit and said fourth wire coupling said humidity control means to said main control unit; and
   connecting means extending from said main control unit to said plant area to thereby have said heat, cool, ventilating and humidity responsive means control the operation of said heating means, said ventilating means, said air conditioning means and said humidifying means in said plant area.

2. A kit for a heating, ventilating, air conditioning and humidifying system as set forth in claim 1 wherein said temperature control means includes manually operable temperature switch means and thermostatically controlled switch means for controlling the operation of said heating means and said air conditioning means, said temperature control means being coupled to said heat and cool responsive means in said main control unit through first and second oppositely poled temperature diodes in said remote control unit, said second wire in said connecting link means, and a heat diode in said main control unit similarly poled to said first temperature diode and a cool diode in said main control unit similarly poled to said second temperature diode.

3. A kit for a heating, ventilating, air conditioning and humidifying system as set forth in claim 2 wherein said manually operable temperature switch means includes at least off and heat positions and said thermostatically controlled switch means responds to increases and decreases in the temperature about said remote control unit, said heat responsive means actuating said heating means in response to AC potential being supplied from said first wire in said connecting link means through said manually operable temperature switch means when in said heat position, said thermostatically controlled switch means when said temperature is below a predetermined temperature, said first temperature diode, said second wire in said connecting link means and said heat diode.

4. A kit for a heating, ventilating, air conditioning and humidifying system as set forth in claim 2 wherein said manually operable temperature switch means includes at least off and cool positions and said thermostatically controlled switch means responds to increases and decreases in the temperature about said remote controlled unit, said cool responsive means actuating said air conditioning means in response to AC potential being supplied from said first wire in said connecting link means through said manually operable temperature switch means when in said cool position, said thermostatically controlled switch means when said temperature is above a predetermined temperature, said second temperature diode, said second wire in said connecting link means and said cool diode.

5. A kit for a heating, ventilating, air conditioning and humidifying system as set forth in claim 1 wherein said ventilating control means includes manually operable ventilating switch means for controlling the operation of said ventilating means, said ventilating control means being coupled to said ventilating responsive means in said main control unit through a first ventilating diode in said remote control unit, said third wire in said connecting link means, and a second ventilating diode in said main control unit poled similarly to said first ventilating diode.

6. A kit for a heating and ventilating, air conditioning and humidifying system as set forth in claim 5 wherein said manually operable ventilating switch means has at least a continuous position, said ventilating responsive means actuating said ventilating means in response to AC potential being supplied from said first wire in said connecting link means through said manually operable ventilating switch means when said manually operable ventilating switch means is in said continuous position, said third wire in said connecting link means and said second ventilating diode.

7. A kit for a heating, ventilating, air conditioning and humidifying system as set forth in claim 1 wherein said humidity control means includes manually operable humidity switch means and humidistatically controlled switch means for controlling the operation of said humidifying means, said humidity control means being coupled to said humidity responsive means in said main control unit through said fourth wire in said connecting link means, a humidity selector switch in said main control unit and a first humidity diode in said main control unit.

8. A kit for a heating, ventilating, air conditioning and humidifying system as set forth in claim 7 wherein said manually operable humidity switch means has at least off and humidify positions and said humidistatically controlled switch means responds to increases and decreases in the humidity about said remote control unit, said humidity responsive means actuating said humidifying means in response to AC potential being supplied from said first wire in said connecting link means through said manually operable humidity switch means when said manually operable humidity switch means is in said humidify position, said humidistatically controlled switch means when said humidity is below a predetermined humidity, said fourth wire in said connecting link means, said humidity selector switch and said first humidity diode.

9. A kit for a heating, ventilating, air conditioning and humidifying system as set forth in claim 8 wherein said humidity selector switch is selectively operable such that said ventilating responsive means actuates said ventilating means whenever said humidity responsive means is actuated.

10. A kit for a heating, ventilating, air conditioning and humidifying system as set forth in claim 8 wherein said humidity selector switch is selectively operable such that said humidity responsive means is actuated only when said heat responsive means is actuated.

11. A kit for a heating, ventilating, air conditioning and humidifying system as set forth in claim 1 including jumper means for actuating said ventilating responsive means whenever said cool responsive means is actuated.

12. A kit for a heating, ventilating, air conditioning and humidifying system as set forth in claim 1 wherein said heating, ventilating, air conditioning and humidifying system includes a transformer in said plant area providing a low voltage AC potential to said remote control unit through said main control unit and said first wire in said connecting link means.

13. A kit for a heating, ventilating, air conditioning and humidifying system as set forth in claim 1 wherein said heat responsive means includes a heat relay coil and heat contacts controlled by said heat relay coil, said cool responsive means includes a cool relay coil and cool contacts controlled by said cool relay coil, said ventilating responsive means includes a ventilating relay coil and ventilating contacts controlled by said ventilating relay coil, said humidity responsive means includes a humidity relay coil and humidity contacts controlled by said humidity relay coil.

14. A kit for a heating, ventilating, air conditioning and humidifying system that includes heating means, ventilating means, air conditioning means and humidifying means in a plant area comprising:

a remote control unit located remotely from said plant area and including:
a temperature control means for controlling the operation of said heating and air conditioning means,
a ventilating control means for controlling the operation of said ventilating means,
a humidity control means for controlling the operation of said humidifying means, and
a rechargeable battery and battery charging means;
a main control unit located adjacent said plant area and including:
heat responsive means responsive to said temperature control means for activating said heating means,
cool responsive means responsive to said temperature control means for activating said air conditioning means,
ventilating responsive means responsive to at least said ventilating control means for activating said ventilating means, and
humidity responsive means responsive to said humidity control means for activating said humidifying means;
a connecting link means for coupling said remote control unit to said main control unit consisting essentially of first, second, third and fourth wires extending from said main control unit to said remote control unit, said battery charging means being coupled to said first wire in said connecting link means by a first battery diode and to said main control unit through said third wire in said connecting link means, and through a second battery diode in said main control unit similarly poled to said first battery diode; and
connecting means extending from said main control unit to said plant area to thereby have said heat, cool, ventilating and humidity responsive means control the operation of said heating means, said ventilating means, said air conditioning means and said humidifying means in said plant area.

15. A kit for a heating, ventilating, air conditioning and humidifying system that includes heating means, ventilating means, air conditioning means and humidifying means in a plant area comprising:

a remote control unit located remotely from said plant area and including:
a temperature control means for controlling the operation of said heating and air conditioning means,
a ventilating control means for controlling the operation of said ventilating means,
a humidity control means for controlling the operation of said humidifying means, and
a rechargeable battery and battery charging means;
a main control unit located adjacent said plant area and including:
heat responsive means responsive to said temperature control means for activating said heating means,
cool responsive means responsive to said temperature control means for activating said air conditioning means,
ventilating responsive means responsive to at least said ventilating control means for activating said ventilating means, and
humidity responsive means responsive to said humidity control means for activating said humidifying means;
a connecting link means for coupling said remote control unit to said main control unit consisting essentially of not more than four wires extending from said main control unit to said remote control unit, said battery charging means being coupled to one of said wires in said connecting link means by a first battery diode and to said main control unit through another of said wires in said connecting link means, and through a second battery diode in said main control unit similarly poled to said first battery diode; and
connecting means extending from said main control unit to said plant area to thereby have said heat, cool, ventilating and humidity responsive means control the operation of said heating means, said ventilating means, said air conditioning means and said humidifying means in said plant area.

* * * * *